(12) United States Patent
Lim et al.

(10) Patent No.: US 7,464,275 B2
(45) Date of Patent: Dec. 9, 2008

(54) APPARATUS FOR SEQUENTIALLY ENABLING AND DISABLING MULTIPLE POWERS

(75) Inventors: Tae Young Lim, Daejeon (KR); Han Jin Cho, Daejeon (KR); Soon Il Yeo, Daejeon (KR); Ig Kyun Kim, Daejeon (KR); Kyoung Seon Shin, Daejeon (KR); Hee Bum Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 499 days.

(21) Appl. No.: 11/213,059

(22) Filed: Aug. 26, 2005

(65) Prior Publication Data

US 2006/0123254 A1    Jun. 8, 2006

(30) Foreign Application Priority Data

Dec. 6, 2004    (KR) ............... 10-2004-0101648

(51) Int. Cl.
*G06F 1/26* (2006.01)
(52) U.S. Cl. .................. 713/300; 713/330; 345/52; 345/211
(58) Field of Classification Search ............ 345/52; 323/234; 713/300
See application file for complete search history.

(56) References Cited

U.S. PATENT DOCUMENTS

| | | | |
|---|---|---|---|
| 5,745,092 A * | 4/1998 | Ito ........................ | 345/95 |
| 5,777,611 A | 7/1998 | Song | |
| 5,878,264 A * | 3/1999 | Ebrahim ................. | 713/323 |
| 6,237,103 B1 * | 5/2001 | Lam et al. .............. | 713/330 |
| 6,243,067 B1 * | 6/2001 | Noguchi et al. ........ | 345/102 |
| 6,429,706 B1 * | 8/2002 | Amin et al. ............. | 327/143 |
| 6,727,681 B2 | 4/2004 | Morita | |
| 6,792,553 B2 * | 9/2004 | Mar et al. .............. | 713/330 |
| 6,850,048 B2 * | 2/2005 | Orr et al. ............... | 323/299 |
| 6,879,139 B2 * | 4/2005 | Brown et al. ........... | 323/299 |
| 7,112,929 B2 * | 9/2006 | Chiou ..................... | 315/224 |
| 7,305,572 B1 * | 12/2007 | Burroughs et al. ...... | 713/300 |

FOREIGN PATENT DOCUMENTS

KR    1993 0011480    7/1993

* cited by examiner

*Primary Examiner*—Nitin C Patel
(74) *Attorney, Agent, or Firm*—Ladas & Parry LLP

(57) ABSTRACT

Provided is an apparatus for controlling multiple powers which is capable of turning on and off the multiple powers in their priorities for systems or components to be supplied with the multiple powers such as a liquid crystal display (LCD) module. In the apparatus for controlling multiple powers, an on-signal of high level is applied to an input terminal, and an output of a control signal generating unit is sequentially changed to a high level whenever a clock is applied to a clock signal input terminal by one period, so that outputs of the multiple powers are sequentially output. In addition, an off signal of low level is applied to the input terminal, and an output of the control signal generating unit is changed to a low level in a reversal order whenever a clock is applied to the clock signal input terminal by one period, so that outputs of the multiple powers are interrupted in the reversal order.

10 Claims, 6 Drawing Sheets

APPARATUS FOR SEQUENTIALLY ENABLING AND DISABLING MULTIPLE POWERS

CROSS-REFERENCE TO RELATED APPLICATION

This application claims priority to and the benefit of Korean Patent Application No. 2004-101648, filed Dec. 6, 2004, the disclosure of which is incorporated herein by reference in its entirety.

BACKGROUND

1. Field of the Invention

The present invention relates to an apparatus for controlling multiple powers for sequential supply and reversal interruption and, more particularly, to an apparatus for controlling multiple powers which is capable of sequentially turning on or reversely turning off the multiple powers in their priorities for systems or components to be supplied with the multiple powers such as a liquid crystal display (LCD) module.

2. Discussion of Related Art

Hereinafter, the supply and the interruption have the same meaning as ON and OFF, which will be used together for simplicity of description.

In general, multiple powers should be supplied to components or systems requiring the multiple powers for safe drive in a sequential manner to comply with their priorities of supplying the powers based on the respective specifications, and should be interrupted in its reversal order. To detail this, in the case of the power supply for driving the LCD module, four kinds of power supply voltage, 3.3V, 5V, -9V, and 15V, are sequentially supplied to the LCD module by respective time intervals of 10 ms, image data are then applied thereto. In addition, in the case of interrupting the power supply, it is interrupted in its reversal order.

For example, one of methods capable of performing sequential supply and reversal interruption on the multiple powers in accordance with the conventional art will be described. FIG. 1 is a circuit view of an apparatus for controlling multiple powers in accordance with the conventional art.

The apparatus for controlling the multiple powers according to the conventional art as shown in FIG. 1 is configured to sequentially switch the multiple power supply voltages by sequentially driving relays using a silicon controlled rectifier (SCR) and counter logical elements. In this configuration, a pair of counter elements, i.e., a counter element for sequential turn on and a counter element for reversal turn off are required to generate a control signal for switching one power supply voltage. An upper block including the counter element is responsible for sequential on control and a lower block is responsible for sequential off control. In addition, one SCR and two relays are required in its output terminal in order to turn off one voltage having levels different from each other in the above-described configuration.

Accordingly, in the apparatus for controlling the multiple powers according to the conventional art, the more the voltages to be controlled are present, the more logical gates and counter semiconductor elements constituted by flip-flops or latches should be used and many relays should also be used, which cause volume to be increased and control to be complicated.

SUMMARY OF THE INVENTION

The present invention is directed to an apparatus for controlling multiple powers which readily controls the multiple powers in sequential and reversal order manners using a small number of semiconductor elements.

One aspect of the present invention is to provide an apparatus for controlling multiple powers, which includes: an input unit for transferring an on and off signal and a clock signal; a power supply and reset unit for supplying the multiple powers and a reset signal; a control signal generating unit for sequentially outputting one signal between a multiple power on signal and a multiple power off signal in response to the on and off signal and the clock signal; a multiple power switching unit for switching the multiple powers in response to one signal between the multiple power on signal and the multiple power off signal; and a multiple power output unit for outputting the multiple powers in a sequential or a reversal order in response to the control signal of the multiple power switching unit.

Preferably, the apparatus for controlling multiple powers includes: an input unit connected to an input line of the control signal generating unit and applying a signal for turning on and off the multiple powers and applying a clock signal; a power supply and reset unit connected to the input line of the control signal generating unit and generating and outputting a reset signal at the time of being supplied with the powers to reset the control signal generating unit; a control signal generating unit including n 2:1 multiplexers (MUX) and n demultiplexer (DMUX) ICs and having n output lines, and connected to the input unit and the power supply and reset unit, and its output line connected to the multiple power switching unit to be reset by receiving the signal from the power supply and reset unit at the time of being supplied with the power, and sequentially outputting n on-signals to n output signals by the multiple power on signal after the power is supplied, and outputting n off-signals to n output lines in a reversal order when the multiple power on signal is changed to the off signal; a multiple power switching unit including n open collector type buffer logical elements and n pull-up resistors, and connected to n output lines of the control signal generating unit, and connected to an input terminal of a multiple power output unit and n multiple powers, and switching the multiple powers of various voltages; and a multiple power output unit including n low dropout voltage regulator ICs for multiple voltages, and connected to the multiple power switching unit and connected to n output terminals, and outputting the multiple powers of various voltages in sequential and reversal orders under control of signals of the multiple power switching unit.

In addition, the input unit is connected to an input line of the control signal generating unit to apply signals for turning on and off the multiple powers, and has a built-in oscillator to allow clock signals to be output to the control signal generating unit.

In addition, the control signal generating unit includes n 2:1 MUXs and n RSFF ICs, and has n output lines, and is connected to the input unit and the power supply and reset unit, and its output line is connected to the multiple power switching unit, so that it may be reset by receiving the signal from the power supply and reset unit at the time of being supplied with the power, and may sequentially output n on-signals to n output lines by means of the multiple power on-signal after the power is supplied, and may output n off-signals to n output lines in a reversal order when the multiple power on signal is changed to the off-signal.

In addition, the multiple power switching unit and the multiple power output unit have n open collector type inverter logical elements and n pull-up resistors, wherein the multiple power switching unit may be configured such that it is connected to n output lines of the control signal generating unit, and is connected to an input terminal of a multiple power output unit and n multiple powers to switch the multiple powers of various voltages, and the multiple power output unit may be configured such that it includes n step down regulator ICs for multiple voltages, and is connected to the multiple power switching unit and connected to n output terminals to output the multiple powers of various voltages in sequential and reversal orders under control of signals of the multiple power switching unit.

In addition, the multiple power output unit may include n first step down regulator ICs for multiple powers, and second step down regulator ICs less than n by one or more, wherein the second step down regulator ICs are connected to outputs of the first step down regulator ICs, and inputs of the n first step down regulator ICs are connected to the multiple power switching unit, and outputs of the second step down regulator ICs are connected to output terminals by the number of the second step down regulator ICs, and outputs of the first step down regulator ICs are also connected to output terminals by the remainder resulted from n subtracted by the number of the second regulator ICs so that positive multiple powers and negative multiple powers less than n by one or more may be output in sequential and reversal orders under control of signals of the multiple power switching unit.

In addition, the multiple power output unit may be configured to combine the low dropout regulator ICs with the step down regulator ICs.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure is thorough and complete and fully conveys the scope of the invention to those skilled in the art.

Figure 1:
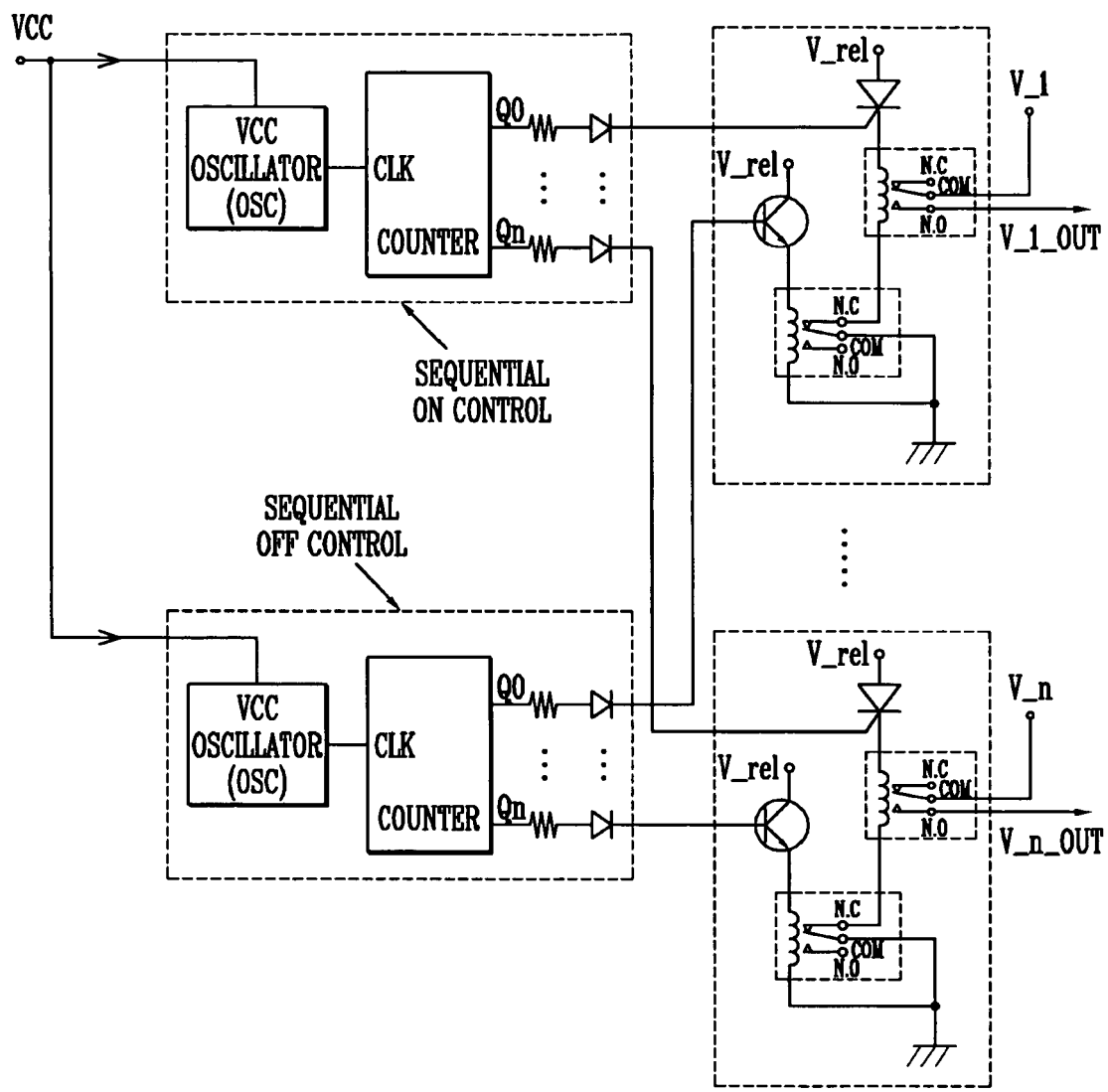
FIG. 1 is a circuit view for explaining an example of an apparatus for controlling multiple powers in accordance with the conventional art.
Figure 2:
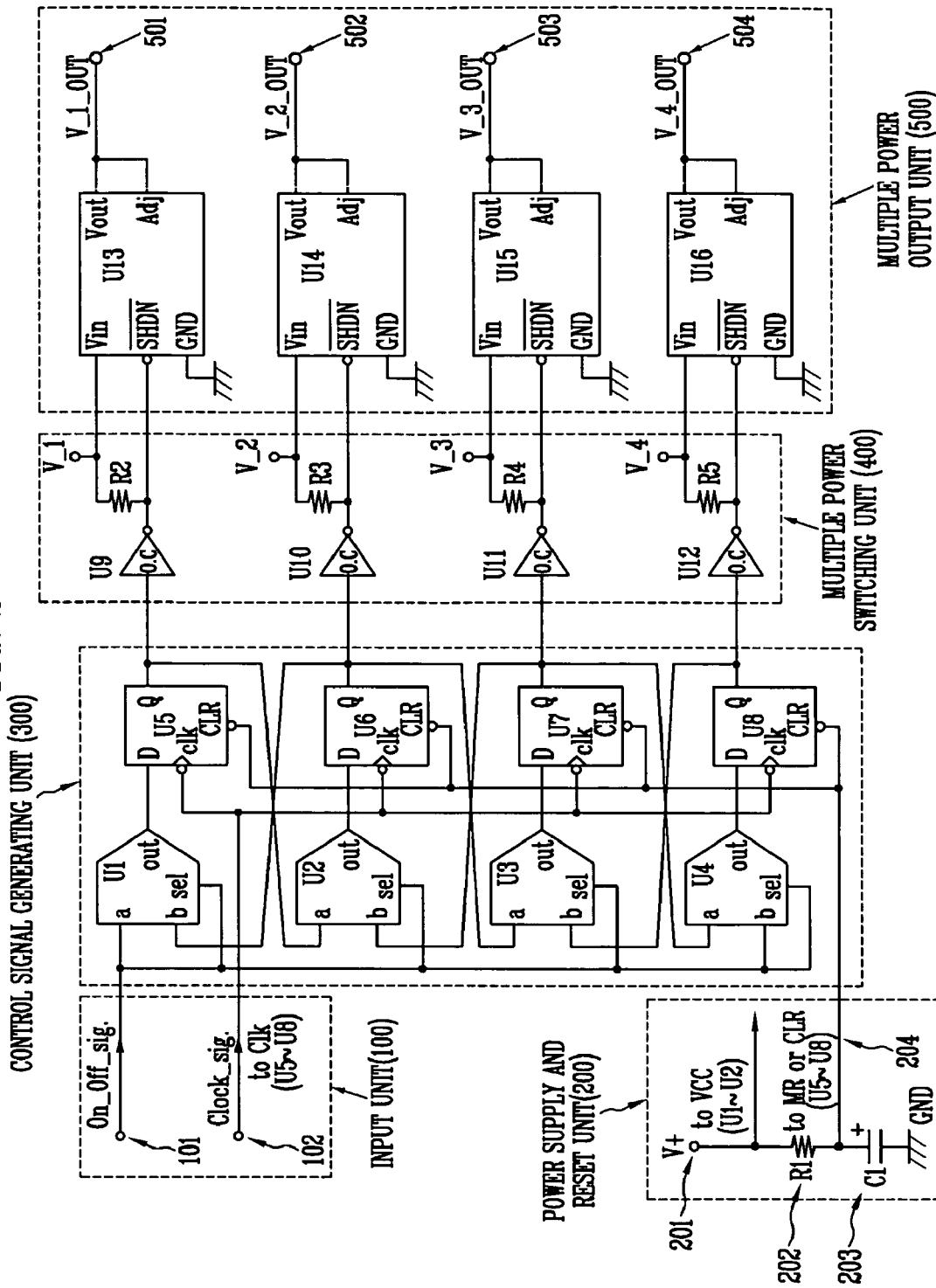
FIG. 2 is a circuit view of an apparatus for controlling multiple powers in accordance with an exemplary embodiment of the present invention.

FIG. 2 is a circuit view illustrating an apparatus for controlling multiple powers in accordance with an exemplary embodiment of the present invention.

Referring to FIG. 2, the apparatus for controlling the multiple powers includes an input unit 100, a power supply and reset unit 200, a control signal generating unit 300, a multiple power switching unit 400, and a multiple power output unit 500 for the sake of sequentially supplying and interrupting the multiple powers.

To detail this, the input unit 100 is constituted by an input terminal 101 which is connected to an input line of the control signal generating unit 300 to externally receive an on and off signal for turning on and off the multiple powers, and a clock signal input terminal 102 which is connected to a clock input line of the control signal generating unit 300 to externally receive a clock signal.

When an on-signal of high level as the on and off signal of the multiple powers is externally applied after the power is supplied to the apparatus of the present invention, the multiple power may be sequentially turned on, and when the off signal of low level is applied to the input terminal 101, it may be turned off in its reversal order. In this case, the time interval for turning on and off the multiple powers in sequential and reversal orders, respectively, is dependent on the period of externally applying the clock to the input terminal 102. In other words, when the clock having a period of 10 ms is applied thereto, the multiple powers may be adjusted to be turned on by 10 ms interval in the sequential order or turned off by 10 ms in its reversal order.

The power supply and reset unit 200 is constituted by a power supply terminal 201 for externally supplying the power to the apparatus, a resistor (R1) 202 connected to the clear (CLR) input line of the control signal generating unit 300, and an interconnection 204 for delivering the power on reset signal generated by the serial connection of the capacitor (C1) 203.

A voltage applied to the power supply terminal 201 is a VCC voltage which complies with the operating voltage of ICs applied to the control signal generating unit 300 and the multiple power switching unit 400. For example, the VCC voltage may include 3.3V, 5V, 12V or the like. In addition, a signal changed from low to high is output to the interconnection 204 for outputting the power on reset signal, and the time for maintaining the low state is determined by the time constant of the resistor (R1) 202 and the capacitor (C1) 203. In the present apparatus, it is set to maintain about 1 second.

The control signal generating unit 300 is constituted by four 2:1 MUXs U1, U2, U3, U4 and four DFF U5, U6, U7, U8 ICs. Selector (sel) pins of all MUXs are connected to each other in common, and are connected to the input terminal 101 for turning on and off the multiple powers and are also connected to an input pin (a) of the first MUX U1. In addition, clock (clk) pins of all DFFs U5, U6, U7, and U8 are connected to each other in common and are connected to the clock signal input terminal 102 for externally receiving the clock signal. In addition, clear (CLR) pins of all DFFs U5, U6, U7, and U8 are connected to each other in common and are connected to the interconnection 204 for delivering the power on reset signal.

In addition, the output pin (out) of the first MUX U1 is connected to the input pin (D) of the first DFF U5, and the output pin (Q) of the first DFF U5 becomes an input U9 of the multiple power switching unit 400 while it is also connected to the input pin (a) of the second MUX U2. In addition, the output pin (out) of the second MUX U2 is connected to the input pin (D) of the second DFF U6, and the output pin (Q) of the second DFF U6 becomes another input U10 of the multiple power switching unit 400 while it is also connected to another input pin (b) of the first FLUX U1 and the input pin (a) of the third MUX U3. In addition, the output pin (out) of the third MUX U3 is connected to the input pin (D) of the third DFF U7, and the output pin (Q) of the third DFF U7 becomes another input U11 of the multiple power switching unit 400 while it is also connected to the input pin (b) of the second MUX U2 and the input pin (a) of the fourth MUX U4. In addition, the output pin (out) of the fourth MUX U4 is connected to the input pin (D) of the fourth DFF U8, and the output pin (Q) of the fourth DFF U8 becomes another input U12 of the multiple power switching unit 400 while it is also connected to the input pin (b) of the third MUX U3.

Figure 3:
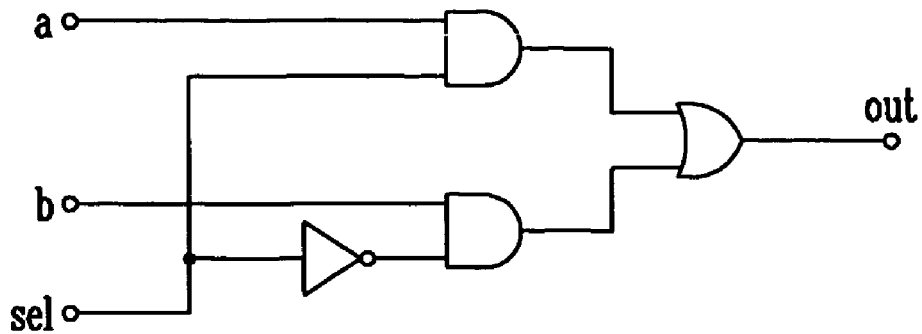
FIG. 3 is a circuit view illustrating an example of a MUX in the apparatus shown in FIG. 2.

2:1 MUXs U1, U2, U3, U4 within the control signal generating unit 300 includes, for example, two AND gates, one inverter, and one OR gate as shown in FIG. 3. By means of this configuration, when HIGH is applied to the selector (sel) pin in the 2:1 MUXs U1, U2, U3, and U4, the input pine (a) is output, and when LOW is applied to the select pin, another input pin (b) is output. As such, the apparatus for controlling the multiple powers according to the present invention includes the MUX equivalent to or same as that of FIG. 3

Referring back to FIG. 2, when the power is supplied to the apparatus, a signal changing from a low state to a high state is output to the interconnection 204 for outputting the power on reset signal, so that all output values of the DFFs become zero. Subsequently, when "1" is applied to the input terminal 101, all MUXs select the input pin (a) and "1" is output to the output of the first MUX U1 to be input to the first DFF U5. When the clock is subsequently applied to the clock pin 102, the output of the first DFF U5 becomes "1" at the time of changed state from a high edge to a low edge. In this case, the outputs of the first to fourth DFFs U5, U6, U7, and U8 are 1, 0, 0, and 0, respectively. In addition, the output of the first DFF U5 is applied to the input pin (a) of the second MUX U2, and the output (out) of the second MUX U2 is applied to the input pin (D) of the second DFF U6.

Subsequently, at the time of the changed state from a high edge to a low edge in the next clock, the output of the second DFF U6 becomes "1". In this case, the outputs of the first to fourth DFFs U5, U6, U7, and U8 are 1, 1, 0, and 0, respectively. In addition, the output of the second DFF U6 is applied to the input pin (a) of the third MUX U3, and the output (out) of the third MUX U3 is applied to the input pin (D) of the third DFF U7.

Subsequently, at the time of the changed state from a high edge to a low edge in the next clock, the output of the third DFF U7 becomes "1". In this case, the outputs of the first to fourth DFFs U5, U6, U7, and U8 are 1, 1, 1, and 0, respectively. In addition, the output of the third DFF U7 is applied to the input pin (a) of the fourth MUX U4, and the output (out) of the fourth MUX U4 is applied to the input pin (D) of the fourth DFF U8.

Subsequently, at the time of the changed state from a high edge to a low edge in the next clock, the output of the fourth DFF U8 becomes "1". In this case, the outputs of the first to fourth DFFs U5, U6, U7, and U8 are 1, 1, 1, and 1, respectively. These output values are kept even when the clock is continuously supplied. Accordingly, the control signal capable of turning on the multiple powers becomes sequentially ON.

Meanwhile, when "0" is applied to the input terminal 101, all MUXs select the input pin (b) and "0" is output to the output (out) of the fourth MUX U4 to be input to the fourth DFF U8. Subsequently, at the time of the changed state from a high edge to a low edge in the next clock, the output of the fourth DFF U8 becomes "0". In this case, the outputs of the first to fourth DFFs U5, U6, U7, and U8 are 1, 1, 1, and 0, respectively. In addition, the output of the fourth DFF U8 is applied to the input pin (b) of the third MUX U3, and the output (out) of the third MUX U3 is applied to the input pin (D) of the third DFF U7.

Subsequently, at the time of the changed state from a high edge to a low edge in the next clock, the output of the third DFF U7 becomes "0". In this case, the outputs of the first to fourth DFFs U5, U6, U7, and U8 are 1, 1, 0, and 0, respectively. In addition, the output of the third DFF U7 is applied to the input pin (b) of the second MUX U2, and the output (out) of the second MUX U2 is applied to the input pin (D) of the second DFF U6.

Subsequently, at the time of the changed state from a high edge to a low edge in the next clock, the output of the second DFF U6 becomes "0". In this case, the outputs of the first to fourth DFFs U5, U6, U7, and U8 are 1, 0, 0, and 0, respectively. In addition, the output of the second DFF U6 is applied to the input pin (b) of the first MUX U1, and the output (out) of the first MUX U1 is applied to the input pin (D) of the first DFF U5.

Subsequently, at the time of the changed state from a high edge to a low edge in the next clock, the output of the first DFF U5 becomes "0". In this case, the outputs of the first to fourth DFFs U5, U6, U7, and U8 are 0, 0, 0, and 0, respectively. These output values are kept even when the clock is continuously supplied. Accordingly, the control signal capable of turning off the multiple powers becomes OFF in the reversal order.

Referring back to FIG. 2, the multiple power switching unit 400 is constituted by four open collector type buffers logical elements U9, U10, U11, and U12 and four pull-up resistors R2, R3, R4, and R5. Each of the four open collector type buffer logical elements U9, U10, U11, and U12 is connected to the output of the control signal generating unit 300, and each output of the buffers U9, U10, U11, and U12 is connected to each side of the four resistors R2, R3, R4, and R5, and the other side of the resistors R2, R3, R4, and R5 is connected to each of four kinds of multiple powers V_1, V_2, V_3, and V_4 which are externally applied. By means of this configuration, the buffers U9, U10, U11, and U12 amplify the respective output signals of the control signal generating unit 300 and output the switching voltages same as those of the four multiple powers V_1, V_2, V_3, and V_4.

The multiple power output unit 500 includes four low dropout voltage regulator (LDO) ICs U13, U14, U15, and U16, and four output terminals 501, 502, 503, and 504. In addition, the input of one side of each of the four constant voltage ICs U13, U14, U15, and U16 is connected to each of the multiple powers V_1, V_2, V_3, and V_4, and the input of the other side is connected to each output of the multiple power switching unit 400, and each output is connected to each of the four output terminals 501, 502, 503, and 504.

In addition, when a low signal is applied to the shutdown (SHDN) input pin in the constant voltage ICs U13, U14, U15, and U16, the multiple powers are interrupted, and when a high signal is applied thereto, the multiple powers are output. The commercially available LT1963A (manufactured by Linear Tech) or the IC equivalent to the same may be employed for the low dropout regulator.

As such, in accordance with the apparatus for controlling the multiple powers of the present invention, the on-signal of high level is applied to the input terminal 101, and whenever the clock is applied to the clock signal input terminal 102 by one period, outputs of the first to fourth DFFs U5 to U8 as the output sides of the control signal generating unit 300 are sequentially changed to high levels, which are buffered in the multiple power switching unit 400, and the outputs V_1_OUT, V_2_OUT, V_3_OUT, and V_4_OUT of the multiple power switching unit 400 are sequentially output to the output terminals 501, 502, 503, 504. In addition, the off signal of low level is applied to the input terminal 101, and whenever the clock is applied to the clock signal input terminal 102 by one period, outputs of the first to fourth DFFs U5 to U8 as the output sides of the control signal generating unit 300 are changed to low levels in the reversal order, which are buffered in the multiple power switching unit 400, and the outputs V_1_OUT, V_2_OUT, V_3_OUT, and V_4_OUT of the multiple power switching unit are interrupted in the reversal order.

As such, the apparatus for controlling the multiple powers according to the present invention uses n pairs of MUX and DFF to control n multiple powers, so that the multiple voltages may be controlled in sequential and reversal orders only with the small number of semiconductor devices, which allows the present invention to be readily applied to power control for various kinds of system-on-chip (SoC) platform or LCD module. In addition, the output signal of the previous stage becomes the input of the following stage so that the time interval and order for turning on may be accurately driven, and may be accurately controlled in the reversal order by means of the MUX at the time of turning off, which allows any loads which requires the multiple powers in their priorities to be operated in a safe manner.

Meanwhile, the apparatus has been described based on the four kinds of multiple powers for simplicity of description, however, it should be appreciated that the kinds of the multiple powers may be varied using the above-described means and method for the apparatus in accordance with the present invention.

Figure 4:
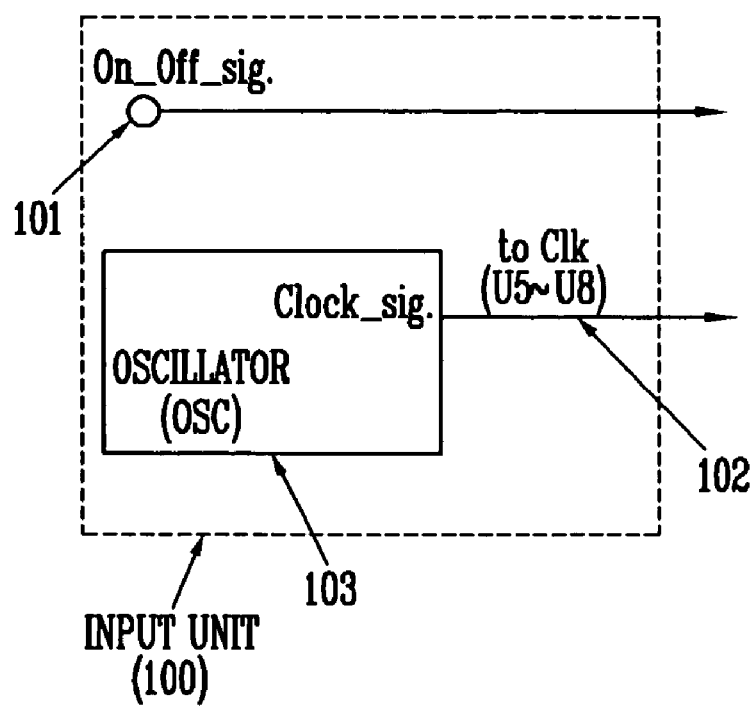
FIG. 4 is a circuit view of another embodiment of an input unit in the apparatus shown in FIG. 2.

FIG. 4 is a circuit view for explaining another example of an input unit of the apparatus for controlling the multiple powers in accordance with an embodiment of the present invention. Referring to FIG. 4, the input unit 100 is connected to the input line of the control signal generating unit 300 and applies the on and off signal 101 for turning on and off the multiple powers, and has a built-in oscillator 103 to continuously output a clock signal to the control signal generating unit 300. As such, the apparatus of the present invention may include the input unit having the built-in oscillator.

Figure 5:
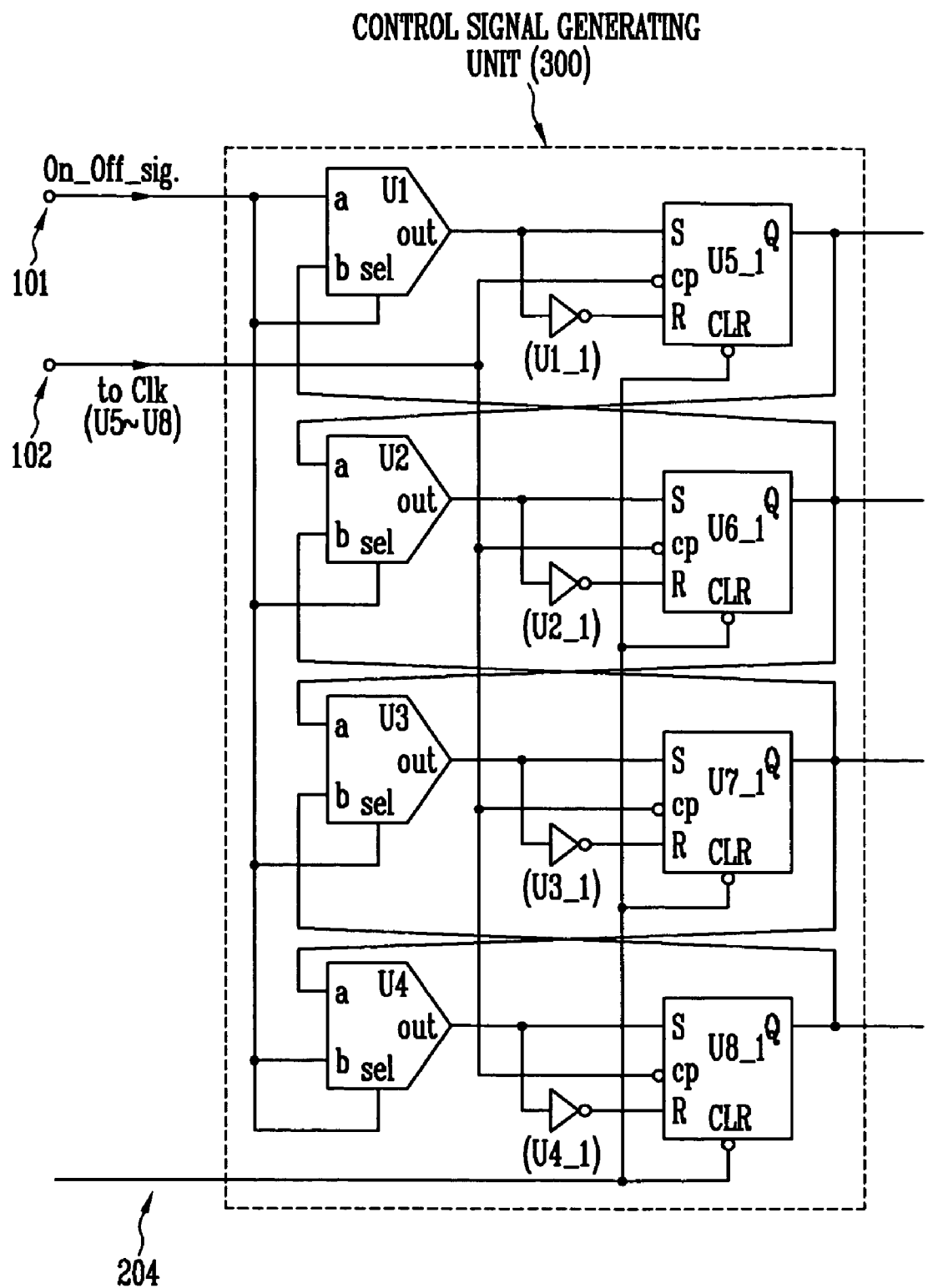
FIG. 5 is a circuit view of another embodiment of a control signal generation unit in the apparatus shown in FIG. 2.

FIG. 5 is a circuit view for explaining another example of the control signal generating unit of the apparatus for controlling the multiple powers in accordance with an embodiment of the present invention. Referring to FIG. 5, the control signal generating unit 300 includes RSFF ICs.

Referring to FIGS. 2 and 5, the control signal generating unit 300 includes four 2:1 MUXs U1, U2, U3, and U4, and four RSFFs U5_1, U6_1, U7_1, and U8_1, and four inverters U1_1, U2_1, U3_1, and U4_1. All select pins of the MUXs are connected to each other in common, and are connected to the input terminal 101 for turning on and off the multiple powers and are also connected to the input pin (a) of one side of the first MUX U1. In addition, all clock (cp) pins of RSFFs U5_1, U6_1, U7_1, and U8_1 are connected to each other in common, and are connected to the clock signal input terminal 102 for externally receiving the clock signal. In addition, all clear (CLR) pins of the RSFFs U5_1, U6_1, U7_1, and U8_1 are connected to each other common and are connected to the interconnection 204 for delivering the power on reset signal. In addition, the output pin (out) of the first MUX U1 is connected to the set input pin (S) of the first RSFF U5_1, and is connected to the reset input pin (R) of the first RSFF U5_1 after it is inverted via the first inverter U1_1, and the output pin (Q) of the first RSFF U5_1 becomes the input of one side U9 of the multiple power switching unit and is also connected to the input pin (a) of one side of the second MUX U2. In addition, the output pin (out) of the second MUX U2 is connected to the set input pin (S) of the second RSFF U6_1, and is connected to the reset input pin (R) of the second RSFF U6_1 after it is inverted via the second inverter U2_1, and the output pin (Q) of the second RSFF U6_1 becomes the input of the other side U10 of the multiple power switching unit and is also connected to the input pin (b) of the other side of the first NTJX U1 and the input pin (a) of one side of the third MUX U3.

In addition, the output pin (out) of the third MUX U3 is connected to the set input pin (S) of the third RSFF U7_1, and is connected to the reset input pin (R) of the third RSFF U7_1 after it is inverted via the third inverter U3_1, and the output pin (Q) of the third RSFF U7_1 becomes the input of the other side U11 of the multiple power switching unit and is also connected to the input pin (b) of the other side of the second MUX U2 and the input pin (a) of one side of the fourth MUX U4. In addition, the output pin (out) of the fourth MUX U4 is connected to the set input pin (S) of the fourth RSFF U8_1, and is connected to the reset input pin (R) of the fourth RSFF U8_1 after it is inverted via the fourth inverter U4_1, and the output pin (Q) of the fourth RSFF U8_1 becomes the input of the other side U12 of the multiple power switching unit and is also connected to the input pin (b) of the other side of the third MUX U3.

Operations of the above-described control signal generating unit 300 is equal to those of the control signal generating unit constituted by DFF described with reference to FIG. 2, so that its description will be skipped.

Figure 6:
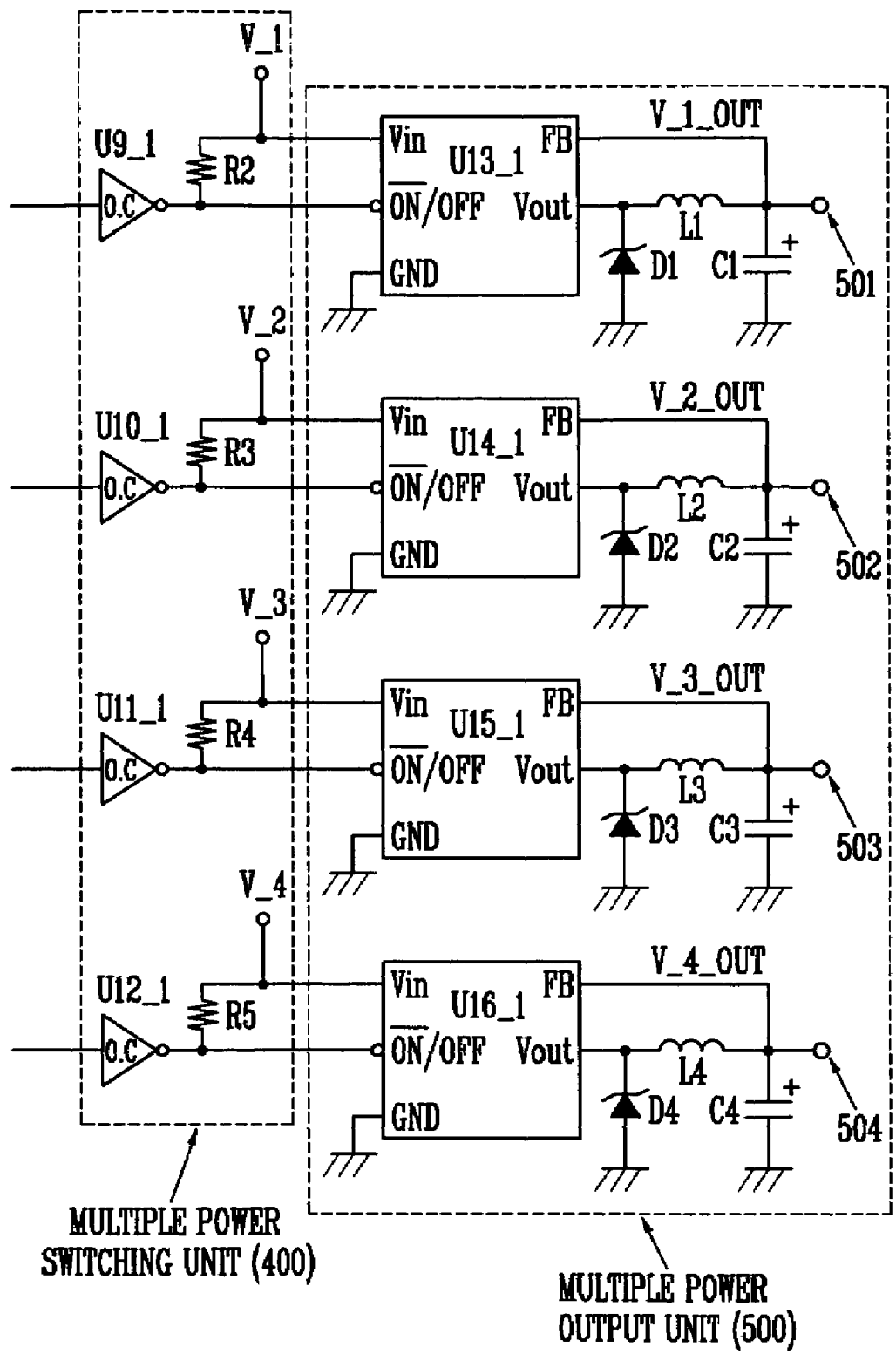
FIG. 6 is a circuit view of another %embodiment of a multiple power switching unit and a multiple power output unit in the apparatus shown in FIG. 2.

FIG. 6 is a circuit view for explaining another example of the multiple power switching unit and the multiple power output unit in the apparatus for controlling the multiple powers in accordance with an embodiment of the present invention. Referring to FIG. 6, the multiple power switching unit 400 is constituted by inverter logical elements, and the multiple power output unit 500 is constituted by step down regulator ICs.

Referring to FIGS. 2 and 6, the multiple power switching unit 400 is constituted by four open collector type inverter logical elements U9_1, U10_1, U11_1, and U12_1 and four pull-up resistors R2, R3, R4, and R5. Each of the four open collector type inverter logical elements U9_1, U10_1, U11_1, and U12_1 is connected to the output of the control signal generating unit 300, and each output of the inverters U9, U10, U11, and U12 is connected to each side of the four resistors R2, R3, R4, and R5, and the other side of the resistors R2, R3, R4, and R5 is connected to each of four kinds of multiple powers V_1, V_2, V_3, and V_4 which are externally applied.

In addition, the inverter logical elements U9_1, U10_1, U11_1, and U12_1 invert the respective output signals of the control signal generating unit 300, and output the switching voltages same as those of the four multiple powers V_1, V_2, V_3, and V_4.

The multiple power output unit 500 is constituted by four step down regulator ICs U13_1, U14_1, U15_1, and U16_1 for multiple powers, and four output terminals 501, 502, 503, and 504. In addition, each input of one side of the four constant voltage ICs U13_1, U14_1, U15_1, and U16_1 is connected to each of the multiple powers V_1, V_2, V_3, and V_4, and each input of the other side is connected to the output of the multiple power switching unit 400, and each output of the constant voltage ICs U13_1, U14_1, U15_1, and U16_1 is connected to grounded via each of four diodes D1, D2, D3, and D4, and is connected to the output terminals 501, 502, 503, and 504 and the capacitors C1, C2, C3, and C4 via inductors L1, L2, L3, and L4, respectively.

Accordingly, when a low signal is applied to the ON/OFF input pin in the constant voltage ICs U13_1, U14_1, U15_1, and U16_1, the multiple powers are output, and when a high signal is applied thereto, the multiple powers are interrupted. The commercially available LM2575 (manufactured by On semiconductor) or the IC equivalent to the same may be employed for the step down regulator.

Figure 7:
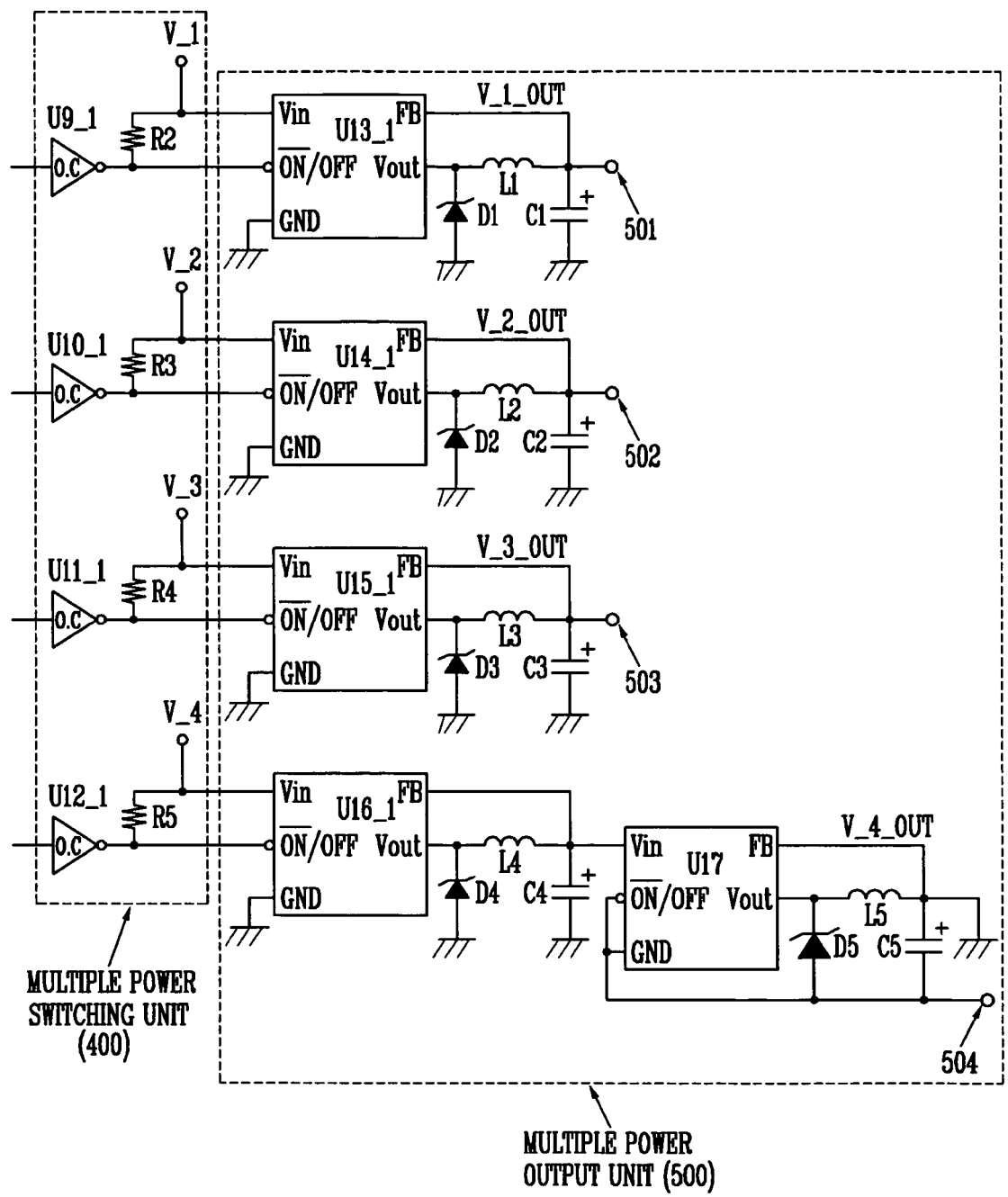
FIG. 7 is a circuit view of yet another embodiment of a multiple power switching unit and a multiple power output unit in the apparatus shown in FIG. 2

FIG. 7 is a circuit view for explaining yet another example of a multiple power switching unit and a multiple power output unit in the apparatus in accordance with an embodiment of the present invention. Referring to FIG. 7, the multiple power switching unit 400 includes inverter logical elements U9_1, U10_1, U11_1, and U12_1, and the multiple power output unit 500 includes step down regulator ICs.

In the present embodiment, a step down regulator IC U17 is added which is capable of controlling a negative voltage. In other words, the apparatus for controlling the multiple powers according to the present embodiment outputs the same switching voltage as the operation of the multiple power switching unit described in FIG. 6. In addition, the multiple power output unit 500 outputs the same multiple powers as the operation and configuration described in FIG. 6 wherein one step down regulator IC U17 is added so that the negative power supply may be controlled.

To detail this, as shown in FIG. 7, the input of the constant voltage IC U16_1 is connected to the positive power supply V_4, and inputs of the other side are connected to respective outputs of the multiple power switching unit 400, and the output of the constant voltage IC U16_1 is connected to ground via one diode D4, which is connected to the capacitor C4 and the input Vin of the constant voltage IC U17 for controlling the negative power supply via the inductor L4. In addition, the output of the constant voltage IC U17 is connected to other inputs ON/OFF and GND via one diode D5, which is connected to the ground GND and the capacitor C5 via the inductor L5. In this case, the output terminal 504 is connected to other inputs ON/OFF and GND of the constant voltage IC U17 to output the negative voltage.

Meanwhile, the multiple power output unit has been configured to include any one between the low dropout regulator IC and the step down regulator IC in the above-described embodiment. The present invention, however, is not limited to such configuration. For example, the multiple power output unit of the apparatus for controlling the multiple powers according to the present invention may be configured to combine the low dropout regulator IC with the step down regulator IC.

According to the present invention as mentioned above, the apparatus for controlling the multiple powers uses n pairs of MUX and DFF to control n multiple powers, so that the multiple voltages may be controlled in sequential and reversal orders only with the small number of semiconductor devices, which allows the present invention to be readily applied to power control for various kinds of SoC platform or LCD module.

In addition, the output signal of the previous stage becomes the input of the following stage so that the time interval and order for turning on may be accurately driven, and may be accurately controlled in the reversal order by means of the MUX at the time of turning off, which allows any loads which requires the multiple powers in their priorities to be operated in a safe manner.

Although exemplary embodiments of the present invention have been described with reference to the attached drawings, the present invention is not limited to these embodiments, and it should be appreciated to those skilled in the art that a variety of modifications and changes can be made without departing from the spirit and scope of the present invention.

What is claimed is:

1. An apparatus for controlling multiple powers, comprising:
   an input unit transferring an on-and-off signal and a clock signal;
   a combined power supply and reset unit supplying the multiple powers and a reset signal;
   a control signal generating unit receiving the on-and-off signal, the clock signal, and the reset signal and sequentially outputting each signal of a multiple power on signal and a multiple power off signal in response to the on-and-off signal, the clock signal, and the reset signal;
   a multiple power switching unit switching the multiple powers in response to one signal of the multiple power on signal and the multiple power off signal; and
   a multiple power output unit outputting the multiple powers in a sequential or reversal order in response to a control signal of the multiple power switching unit.

2. The apparatus according to claim 1, wherein the input unit includes an oscillator generating the clock signal.

3. The apparatus according to claim 1, wherein the power supply and reset unit is connected to an input line of the control signal generating unit, and generates and outputs the reset signal at the time of being supplied with the multiple powers to reset the control signal generating unit.

4. The apparatus according to claim 1, wherein the multiple power switching unit includes a plurality of open collector type buffer logical elements and a plurality of pull-up resistors, and switches the multiple powers of various voltages.

5. The apparatus according to claim 1, wherein the multiple power output unit includes a plurality of low dropout regulator integrated chips (ICs) for multiple voltages.

6. The apparatus according to claim 1, wherein the multiple power output unit includes a plurality of step-down regulator integrated chips (ICs) for multiple powers.

7. The apparatus according to claim 1, wherein the multiple power output unit includes a plurality of first step-down regulator integrated chips (ICs) for multiple voltages, and second step-down regulator ICs for multiple voltages smaller than the number of the first step-down regulator ICs by at least one, and the second step-down regulator ICs are connected to output sides of the first step-down regulator ICs and output positive multiple powers and negative multiple powers having the number of the second step-down regulator ICs by means of the control signal of the multiple power switching unit in sequential and reversal orders.

8. The apparatus according to claim 1, wherein the multiple power output unit is configured to be combined with the low dropout regulator ICs and the step-down regulator ICs.

9. An apparatus for controlling multiple powers comprising:
   an input unit for transferring an on-and-off signal and a clock signal;
   a power supply and reset unit for supplying the multiple powers and a reset signal;
   a control signal generating unit for sequentially outputting one signal of a multiple power on signal and a multiple power off signal in response to the on-and-off signal and the clock signal;
   a multiple power switching unit for switching the multiple powers in response to one signal of the multiple power on signal and the multiple power off signal; and a multiple power output unit for outputting the multiple powers in a sequential or reversal order in response to a control signal of the multiple power switching unit, wherein the control signal generating unit includes: a plurality of 2:1 multiplexers (MUX) and a plurality of D flip-flop (DFF) integrated chips (ICs); receives the reset signal at the time of being supplied with the multiple powers to be reset; sequentially outputs the on-signal to a plurality of output lines by means of the multiple power on signal after the multiple powers are supplied; and outputs the off signal to the plurality of output lines in a reversal order when the multiple power on signal is changed to the off signal.

10. An apparatus for controlling multiple powers comprising:

an input unit for transferring an on-and-off signal and a clock signal;

a power supply and reset unit for supplying the multiple powers and a reset signal;

a control signal generating unit for sequentially outputting one signal of a multiple power on signal and a multiple power off signal in response to the on-and-off signal and the clock signal;

a multiple power switching unit for switching the multiple powers in response to one signal of the multiple power on signal and the multiple power off signal; and a multiple power output unit for outputting the multiple powers in a sequential or reversal order in response to a control signal of the multiple power switching unit, and wherein the control signal generating unit includes: a plurality of 2:1 multiplexers (MUX) and a plurality of RS flip-flop (RSFF) integrated chips (ICs); receives the reset signal at the time of being supplied with the multiple powers to be reset; sequentially outputs the on-signal to a plurality of output lines by means of the multiple power on signal after the multiple powers are supplied; and outputs the off signal to the plurality of output lines in a reversal order when the multiple power on signal is changed to the off signal.

* * * * *